United States Patent Office 3,452,066
Patented June 24, 1969

3,452,066
AMIDO CARBOXYLIC ACID SALTS OF AMINES
Hans S. Mannheimer, 23 Haines Cove Drive,
Toms River, N.J. 08560
No Drawing. Filed Aug. 11, 1966, Ser. No. 571,733
Int. Cl. C07c *143/08;* C11d *1/16;* A61k *7/08*
U.S. Cl. 260—401                                  14 Claims This invention relates to novel compounds and to methods for producing them, and also to novel compositions of matter containing one or more of said compounds as components thereof and also to novel methods for using said compounds and compositions of matter. In one of its more specific aspects the invention is directed to novel salts of certain water soluble, amphoteric surface active agents, to methods for preparing them and also to novel compositions of matter in which one or more of said salts are components thereof and also to novel methods for using said novel salts and compositions of matter. Said novel and unique salts of this invention may be defined as carboxylate salts of said amphoteric, surface active agents, and are within either one of the following generic formulas:

Ia

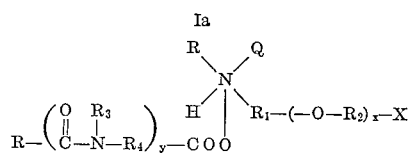

and

Ib

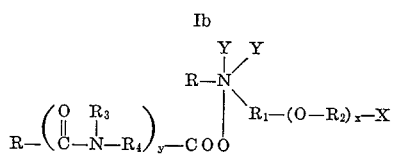

each R is independently selected from the group consisting of hydrocarbon radicals of at least 6 carbon atoms and generally of 6–24 carbon atoms and is preferably straight or branch chain, saturated or unsaturated, aliphatic hydrocarbon whose unsaturation is due solely to ethylenic linkage, that is one or more ethylenic linkages therein, or may be alkyl-aryl wherein the alkyl portion is at least 6 carbon atoms and the aryl portion is mononuclear or may be the hydrocarbon radical of abietic acid; Q is selected from the group consisting of (a) hydrogen, (b) alkyl radicals of 1–6 carbon atoms, (c) hydroxy alkyl radicals of 2–6 carbon atoms, (d) alkylene oxide adducts of said hydroxy alkyl radicals and containing 1–15 moles of alkylene oxide of 2–4 carbon atoms per hydroxy group therein and (e) $R_1$—(O—$R_2$)$_x$—X; $R_1$ is selected from the group consisting of (f) alkylene groups of 1–4 and preferably 2–4 carbon atoms, (g) hydroxy alkylene groups of 3–4 carbon atoms and (h) alkylene oxide adducts of (g) containing 1–15 moles of alkylene oxide per hydroxy group therein; each $R_2$ is independently selected from the group consisting of (f), (g) and (h); each Y is independently selected from the group consisting of (b), (c), (d) and (e); $R_3$ is selected from the group consisting of hydrogen and alkyl radicals of 1–4 carbon atoms; and $R_4$ is alkylene of 1–2 carbon atoms, examples of which are —CH$_2$—,

—CH—
|
CH$_3$ and —CH$_2$—CH$_2$—; $x$ is 0–15; $y$ is zero or one; X is SO$_3$M or OSO$_3$M; and M is hydrogen or preferably an alkali metal or other cationic equivalent organic or inorganic, including NH$_3$ etc., and for most purposes is sodium or potassium.

I have discovered that said compounds of Formula I could be produced by reacting under certain conditions amphoteric surface active agents within one of the generic formulas:

IIa

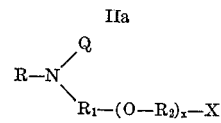

and

IIb

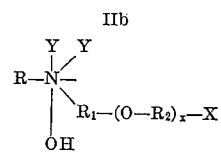

with an anionic within the generic formula:

III

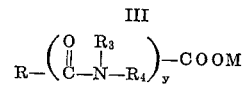

The compounds of Formula II may be prepared in the manners well known to the art. In general, the method for producing same consists in reacting, for example, 1 mol of R—NH$_2$ with 1–3 moles of an appropriate sultone, available halogen=$R_1$—(O—$R_2$)$_x$—X, or the unsaturated sulfonic acids and sulfonates recited in U.S. Patent 2,601,256 of June 24, 1952 as well as others which may be available or producible. The reaction product is subsequently treated with an aqueous solution of caustic soda. By such reaction, there are produced compounds of Formula II*a*, wherein Q is H when only 1 mole of the sulfo reactant is used, Q is $R_1$—(O—$R_2$)$_x$—X when 2 moles of sulfo reactant is used and compounds of Formula II*b* are produced wherein each Y is $R_1$—(O—$R_2$)$_x$—X when 3 moles of sulfo reactant are used.

Examples of some of the specific sulfo compounds usable for the production of the compounds of Formulas II*a* and II*b* are hydroxy propane sultone disclosed in my U.S. Patent 3,100,779 of Aug. 13, 1963, propane sultone, chlorsulfonic acid, chlorethane sulfate, chlor propane sulfonate, brom methane sulfonic acid, chlor methane sulfonate, and those recited in said Patent 2,601,256.

The compounds of Formula III include the common soaps (R—COOM) and the sodium salts of amides of certain amino acids produced from said monocarboxylic acids (R—COOH) and said amino acids

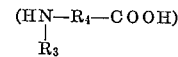

in the manners known to the art. The compounds of Formula III may be used alone or in admixtures of two or more of them or other admixtures, such as those sold as "Lamapon" and "Maypon," being amides of mixtures of naturally occurring proteins which have been hydrolyzed.

The amphoteric compounds of Formulas II are useful as detergent, foaming, wetting, emulgating and emulsifying agents and find application in the fields shampoos and other cosmetics. They are also useful as surface active agents in the field of treating natural and synthetic fibers in the textile and related fields where they may be employed as synthetic detergents, dye assistants and softeners. However, they do have the disadvantage of being relatively expensive when compared with common soap,

| o. | R | R1 | R2 | Y | Q | X | x |
|---|---|---|---|---|---|---|---|
| (1) | $C_{12}H_{25}$ | $CH_2CHCH_2$<br>\|<br>$OH$ | | | H | s | 0 |
| (2) | $C_9H_{19}C_6H_4$ | $CH_2CHCH_2$<br>\|<br>$OH$ | | | $C_2H_4OH$ | s | 0 |
| (3) | $C_8H_{17}$ | $CH_2CHCH_2$<br>\|<br>$OH$ | | | $CH_3$ | s | 0 |
| (4) | $C_{12}H_{25}$ | $CH_2CHCH_2$<br>\|<br>$OH$ | | | q-1 | s | 0 |
| (5) | $C_{10}H_{21}$ | $CH_2CHCH_2$<br>\|<br>$OH$ | | | q-2 | s | 0 |
| (6) | $C_{12}H_{25}$ | $CH_2$ | | | $CH_2SO_3M$ | s | 0 |
| (7) | $C_{12}H_{25}$ | $C_2H_4$ | | | $C_2H_4SO_4M$ | s' | 0 |
| (8) | $C_{12}H_{25}$ | $C_3H_6$ | | $C_2H_4$ | q-3 | s | 1 |
| (9) | $C_{12}H_{25}$ | $CH_2CHCH_2$<br>\|<br>$OH$ | | q-1 and q-1 | | s | 0 |
| (10) | ab | $CH_2CHCH_2$<br>\|<br>$OH$ | | q-1 and q-4 | | s | 0 |
| (11) | $C_{12}H_{25}$ | $CH_2CHCH_2$<br>\|<br>$OH$ | | $C_6H_{13}$ and $C_2H_4OH$ | | s | 0 |
| (12) | $C_{12}H_{25}$ | $C_3H_6$ | $C_2H_4$ | $CH_3$ and $CH_3$ | | s | 1 | of causing a low but some degree of eye stinging and of having a poor hair-lubricity characteristic when compared with common soaps when used for hair shampooing.

While the common soaps are inexpensive and good cleansing agents, they have certain undesirable characteristics, among which are: poor foamability in hard water; when used for shampooing they sometimes form insoluble salts with the alkaline earth ions present in the water and these salts deposit on the hair thereby imparting a dull appearance thereto and generally require rinses of an acidic nature for their removal; are eye stinging, tend to precipitate at pH of 7 or below, foam poorly at pH of 6–7.

While the amides of said amino acids do exhibit better resistance to hard water when compared with common soaps, but exhibit poor foam and poor foam stability in hard water; they dull hair as do the common soaps but to a lesser extent when used as shampoos; they precipitate out in aqueous media at pH 4.5.

The novel compounds have the following unexpected combination of properties: they are substantially non-eye-stinging in those concentrations in which appreciable eye-stinging is evidenced with either compounds of Formulas II or III; they are non-irritating to eyes and skin; they are better foamers than compounds of Formulas II or III in average or hard water; they have good foam stability; they tolerate the presence of chlorine bleaches; they do not dull hair when used for shampooing and consequently no special after rinse is required; they impart softness and manageability to hair which has been shampooed therewith in ordinary as well as hard water; they may be used in shampoos and other cosmetics at pH of 4.5–8.5 and under these conditions are better foaming agents; they are better detergents for cotton with average or hard water; do not precipitate and at pH as low as 4.5.

Examples of some of the amino acids from which compounds of Formula III are produced are beta-alanine ($NH_2CH_2$—$CH_2COOH$), DL-alpha-alanine and L-alpha-alanine, both represented by the formula ($CH_3CH(NH_2)(COOH)$)

sarcosine ($CH_3NHCH_2COOH$), etc. and the protein hydrolyzates which are mixtures of amino acids produced by the hydrolysis of naturally occurring proteins.

Some specific examples of said reactants employed in the production of the novel salts of this invention are of Formula II shown in the following table and given by way of illustration and not limitation:

Coco is the hydrocarbon radical of coconut fatty acids: ab is $C_{19}H_{29}$, the hydrocarbon radical of abietic acid: s is $SO_3M$; s' is $SO_4M$; q-1 is $CH_2CHCH_2SO_3M$;
\|
$OH$ q-2 is $C_2H_4O(C_2H_4)_3H$; q-3 is $C_3H_6OC_2H_4SO_3M$; q-4 is $C_3H_6SO_3M$.

Reactants (1)–(5) and (11) are disclosed in my U.S. Patent 3,198,822 of Aug. 3, 1965. Reactants (6), (7) and (8) may be produced by reacting $C_{12}H_{25}NH_2$ with 2 mols of halogen-$CH_2SO_3M$, halogen-$SO_4M$ and $CH_2$=CH—$CH_2$—O—$CH_2CH_2SO_3M$ respectively; reactant (9) may be produced by reacting 1 mol of said lauryl amine with 3 mols of my hydroxy propane sultone; reactant (10) is produced by reacting (4) with 1 mol of propane sultone and (12) may be produced by reacting 1 mol of allyl oxyethyl propane sulfonic acid with 1 mol of $C_{12}H_{25}N(CH_3)_2$ and then treating same with an aqueous solution of caustic soda.

Specific examples of some reactants of Formula III given by way of illustration and not limitation are the sodium and potassium soaps of stearic, coconut, oleic, palmitic, lauric, lineoleic, abietic acids and $C_9H_{19}\cdot C_6H_4\cdot COOH$ and those compounds of Formula III when y is 1 and produced by reacting sarcosine, beta-alanine, said alpha-alanines and protein hydrolyzates with the aforesaid acids, and also "Maypon" and "Lamapon."

The compounds of Formula I are prepared by adding 1–3 moles of (a) one or a combination of two or more compounds of Formula II and 1–3 moles of (b) one or a combination of two or more compounds of Formula III into a quantity of water under agitation and measuring about 1½ times the combined weight of (a) and (b). While being constantly stirred, the pH of the resulting solution is adjusted to about 10–11 by the addition of sufficient aqueous solution of caustic soda (50% conc.). The solution is heated to about 50–60° C. and maintained at that temperature while there is slowly added thereto, with stirring, an aqueous solution of an acidic agent such as phosphoric, citric, hydrochloric, hydroxyacetic, etc. until the pH thereof is lowered to about 8 or below as for example about 7.5, whereby the compounds of Formula I are produced and are present as solutes in the resulting solutions.

Each of said individual specific compounds of Formula II, reactants (1)–(12), are reacted with each of the specific compounds of Formula III before set forth in the manner heretofore described to provide literally hundreds of different compounds of Formula I.

The specific compounds produced by reacting each reactant (1)–(8) with the respective soaps and amides hereinbefore recited are of the generic Formula Ia, with the RCOO— groups of the soaps and a hydrogen connected directly to the nitrogen of reactants (1)–(8), and with the carboxylates of the amides and a hydrogen connected directly to the nitrogen of reactants (1)–(8).

The specific compounds produced by reacting each reactant (9)–(12) with the respective soaps and amides heretofore recited are of the generic Formula Ib, with the RCOO— groups of the soaps substituted for the OH group of (9)–(12) and the carboxylate groups of the amides substituted for the OH group of (9)–(12) due to reaction between (9)–(12) and said soaps and amides wherein a by-product of reaction is MOH, the M being that of said soaps and amides and the OH being that of (9)–(12).

Besides having the unexpected combinations of properties heretofore set forth, representative compounds of Formula I were compared with corresponding compounds produced by reacting compounds of Formula III with compounds which were the same as those of Formula II except that the $SO_3M$ and the $OSO_3M$ groups thereof were replaced by COOM groups. It was found that the resulting compounds, which were carboxylate salts of amphoteric carboxylates, were eye-stinging and therefore were not suitable for use as components in non-eye-stinging shampoos.

In testing various representative compounds of Formula I at .2% concentration using the conventional Ross-Miles test, I was startled to observe that the compound

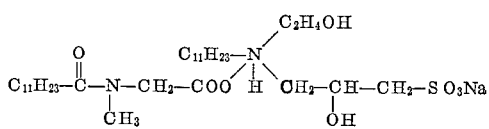

produced greater foam than that obtainable with other compounds, except those of Formula I, which I had previously produced.

It is to be understood that compounds of Formulas II and III other than those specifically before set forth may be reacted in the manner heretofore described to provide additional compounds of Formula I. It is also to be understood that while M is preferably sodium or potassium, hydrogen as well as ammonium are equivalents thereof as are those other cation equivalents from amines for example such as amino ethyl amine, etc. It is also to be understood that R, $R_1$, $R_2$, $R_3$, $R_4$, Q, X, M, Y, $x$ and $y$ as they occur throughout this entire desription are as first defined.

It is further to be understood that the following claims are intended to cover all the generic and specific features of the invention herein described and all statements of the invention which as a matter of language might be said to fall therebetween.

I claim:

1. A compound within one of the following generic formulas:

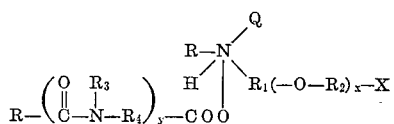

and

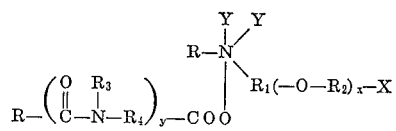

each R is of 6–24 carbon atoms and is independently selected from the group consisting of saturated and unsaturated aliphatic hydrocarbons whose unsaturation is due solely to ethylenic linkage, alkyl-aryl hydrocarbons wherein the alkyl portion is at least 6 carbon atoms and the aryl portion is mononuclear and the hydrocarbon radical of abietic acid; Q is selected from the group consisting of (a) hydrogen, (b) alkyl radicals of 1-6 carbon atoms, (c) hydroxy alkyl radicals of 2–6 carbon atoms, (d) alkylene oxide adducts of said hydroxy alkyl radicals and containing 1–15 moles of alkylene oxide of 2–4 carbon atoms per hydroxy group therein and (e) $R_1$—$(O$—$R_2)_x$—X; $R_1$ is selected from the group consisting of (f) alkylene groups of 1–4 carbon atoms, (g) hydroxy alkylene groups of 3–4 carbon atoms and (h) alkylene oxide adducts of (g) containing 1–15 moles of alkylene oxide per hydroxy group thereof; each $R_2$ is independently selected from the group consisting of (f), (g), (h); $R_3$ is alkyl of 1–4 carbon atoms; $R_4$ is alkylene of 1–2 carbon atoms; $x$ is 0–15; $y$ is zero or one; each Y is independently selected from the group consisting of (b), (c), (d) and (e); X is $SO_3M$ or $OSO_3M$; and M is hydrogen or an alkali metal.

2. A compound according to claim 1, $R_3$ is hydrogen, $R_4$ is $CH_2$—$CH_2$ and $y$ is 1.

3. A compound according to claim 1, $R_3$ is hydrogen, $R_4$ is

and $y$ is 1.

4. A compound according to claim 1, $R_3$ is $CH_3$, $R_4$ is $CH_2$ and $y$ is 1.

5. A compound according to claim 1, $y$ is zero.

6. A compound according to claim 1, Q is $C_2H_4OH$.

7. A compound according to claim 6, $R_3$ is hydrogen, $R_4$ is $CH_2$—$CH_2$ and $y$ is 1.

8. A compound according to claim 6, $R_3$ is hydrogen, $R_4$ is

and $y$ is 1.

9. A compound according to claim 6, $R_3$ is $CH_3$, $R_4$ is $CH_2$ and $y$ is 1.

10. A compound according to claim 1, Q is $C_2H_4OH$, $R_1$ is

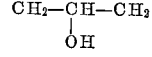

$x$ is 0 and X is $SO_3M$.

11. A compound according to claim 10, $y$ is zero.

12. A compound according to claim 10, each R is $C_{11}H_{23}$, $R_3$ is $CH_3$, $R_4$ is $CH_2$ and $y$ is 1.

13. A method for producing a compound within a generic formula of claim 1 comprising in an aqueous solution of (A) a compound of one of the formulas:

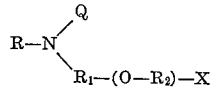

and

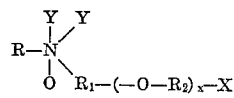

and (B) a compound of the formula
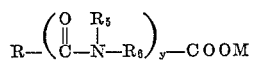
increasing the pH thereof to about 10–11 and then reducing the pH to a value below 8.
14. A method according to claim 10 and heating said solution while maintaining the pH thereof below 8.
References Cited
FOREIGN PATENTS
981,938   6/1951   France.
DANIEL D. HORWITZ, *Primary Examiner.*
U.S. Cl. X.R.
167—85, 87; 252—8.75, 161